A. R. THOMPSON.
FILLING VALVE FOR SYRUPERS.
APPLICATION FILED DEC. 16, 1919.
1,355,016.
Patented Oct. 5, 1920.
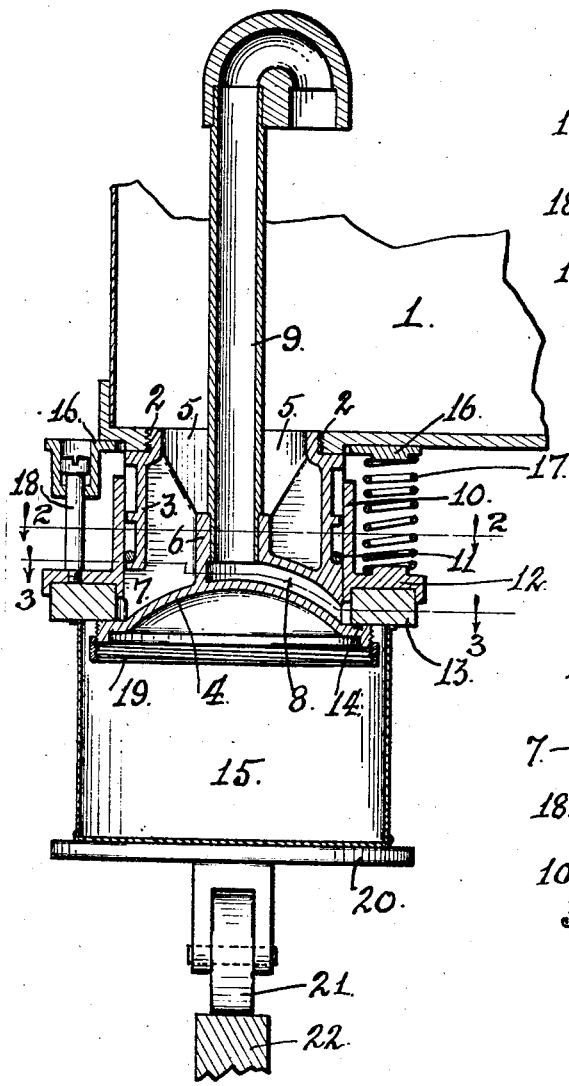
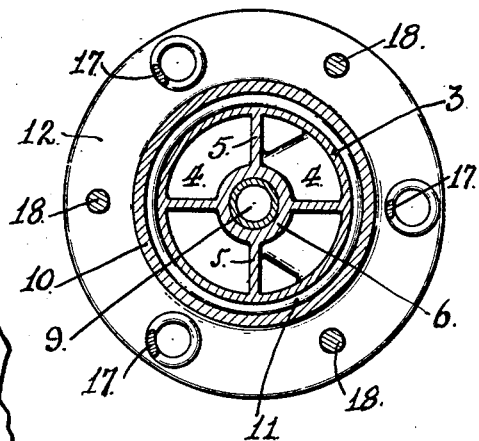
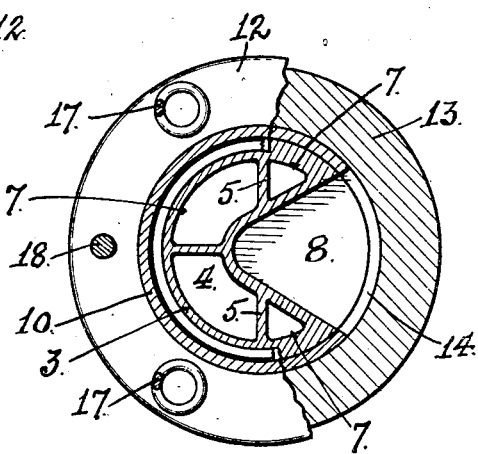
INVENTOR.
Albert R. Thompson
BY
Booth & Booth
ATTORNEYS.

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

FILLING-VALVE FOR SYRUPERS.

1,355,016.  Specification of Letters Patent.  Patented Oct. 5, 1920.

Application filed December 16, 1919. Serial No. 345,432.

*To all whom it may concern:*

Be it known that I, ALBERT R. THOMPSON, a citizen of the United States, residing at San Jose, in the county of Santa Clara and State of California, have invented certain new and useful Improvements in Filling-Valves for Syrupers, of which the following is a specification.

My invention relates generally to filling-valves especially adapted to syruping machines used in the canning art, and particularly to valves for this purpose adapted, by means of an associated displacement body entering the can, to automatically provide for the requisite volume of syrup in the cans, preparatory to their introduction into the exhaust box; to vary this volume according to circumstances; and to avoid undue pressure upon the relatively solid contents of the cans while being filled.

A valve of this general character is disclosed in Letters Patent of the United States No. 1288749, granted upon my application December 24, 1918.

My present invention is an improvement upon this patented valve, said improvement comprising some advantageous details of construction hereinafter fully described, but more especially consisting in the provision of means for practically eliminating the drip from the valve after the requisite volume of syrup has been supplied to the can, which said drip, in the previous patented construction, resulted from the then location of the air-exit duct passage. The change in this particular, in the present valve, and which accomplishes the end in view of avoiding this drip, and the other improvements and the objects thereof, will be hereinafter fully disclosed by reference to the accompanying drawings, in which—

Figure 1 is a vertical section of my filling valve.

Fig. 2 is a horizontal section on the line 2—2 of Fig. 1.

Fig. 3 is a horizontal section on the line 3—3 of Fig. 1.

1 is the syrup tank, into the bottom of which is screwed at 2 the outlet fitting 3, formed with a circumferentially projecting base 4 having an inverted dish or bell shape. The fitting 3 has interior radial webs 5 joining a tubular central extension 6 rising from the base, and said base throughout the larger portion of its upper surface is separated from the body of the fitting by a filling or supply space 7. In the remaining portion of said base is formed an air-exit-duct 8, leading from the peripheral region of the base into the tubular extension 6, in which said extension is fitted the air vent pipe 9, which rises within the tank 1 and terminates above the level of the syrup in said tank.

10 is a valve sleeve fitted to and adapted to slide vertically on the body portion of the outlet fitting 3, a tight joint between the two being supplied by an intervening gasket 11, round in cross-section, and adapted to roll in its seat, thereby reducing friction and wear, items of value in view of the frequent movement of said sleeve. The valve sleeve 10 has a base flange 12, which carries a gasket-valve 13, having an operative underface or surface wide enough to seat itself upon the peripheral valve-seat region 14 of the base member 4 of the outlet fitting 3, and also upon the upper edge a can 15 to be filled with syrup.

16 is a ring adapted to bear up under the tank 1, and between which and the flange 12 of the valve sleeve 10 are fitted springs 17, preferably three in number, at equi-distant points. These springs normally hold the valve sleeve 10 down, with its gasket valve 13 seated upon the valve-seat 14 of the outlet fitting 3, thereby closing all communication of the exterior with the filling space 7 and the air-exit duct 8.

Between the ring 16 and the flange 12 are the limiting bolts 18, which are slidably headed in the ring and tapped in the flange, as shown. These bolts hold the valve structure assembled before being fitted to the tank, and their length is such that when at their limit of separation between ring and flange, the screw threaded end of the outlet fitting projects above the ring a distance enabling it to be easily started into its threaded connection with the tank, without interference with the spring pressure. But as the outlet fitting 3 is screwed home, the ring, pressing up under the tank compresses the springs to the required tension, the heads of the limiting bolts 18 sliding in the ring to permit this.

The periphery of the base 4 of the outlet fitting 3 is threaded to receive a ring extension 19, the adjustment of which varies the penetration of the base into the can.

In order to illustrate the elevation of the can to its association with the filling valve, I have shown a table 20, having a foot-roller 21, which travels on a cam track 22. The fitting of the valve structure to the tank and its operation are as follows.

It is of advantage that the valve-structure be readily applied, easily removed, and capable of being dismembered and reassembled conveniently. By means of the limiting bolts 18, the several parts are held assembled in such manner, that the outlet fitting 3 may be readily started in its screw connection in the tank, and when fully connected the springs are brought to the required tension for making a tight joint between the gasket valve 13 and the valve-seat 14. When the valve-structure is unscrewed the bolts 18 prevent the parts from falling apart and unseating the springs. But by removing the bolts, all the parts readily separate.

Assume the valve structure to be fitted to the tank and in the position shown in Fig. 1, with the base 4 penetrating the can, and peripherally spaced from the can wall. It will be seen that the syrup from the tank fills the cavity of the outlet fitting and the supply space 7, but is stopped at the mouth of said space by the spring pressure contact of the gasket valve 13 with the valve seat 14 of the base 4. Also, it will be seen that the air-exit-duct 8 in the base 4 is closed by this same contact. Now when the can 15 is lifted, it will by contact with the gasket valve 13 form a close joint for itself, but at the same time will raise said gasket valve from its seat, the valve sleeve 10 yielding upwardly against the spring pressure. Communication is thus simultaneously established between the tank 1 and the interior of the can 15 through the supply space 7 and the space surrounding the base 4, and between the interior of the can and the outer air, through the air-exit-duct 8 and bent pipe 9. Syrup now flows into the can, the air escaping through the duct and pipe.

When the syrup in the can reaches and covers the inlet to the air-exit-duct 8, there will still remain in the can, under the dish or bell of the base 4, a body of air which is confined therein and serves as a cushion displacement in the can. Though the flow of syrup continues, and slowly rises in the air-exit-duct 8 and pipe 9, yet when the can is full, the relatively small volume in said duct and pipe is immediately trapped by the lowering of the filled can, which trapping is due to the return of the gasket valve 13 to its seat 14, and by this same return and at the same time the main flow of syrup from the tank is cut off, by the closing of the supply space 7. Thus when the can is lowered, there is no drip from the filling valve, a clean cut off being had; and the can may, therefore, be lowered the moment it is filled, without having any increase or any stop or waste, due to drip.

Now when a can is next elevated to its association with the valve structure, the opening of both the liquid communication and the air communication, being simultaneous, the liquid pressure in the can tending to drive air out, will not be sufficient to prevent the small amount of syrup confined and still in the air-exit-duct 8 by the previous operation, from immediately running into the can. Thus this small volume of syrup, instead of being a drip excess from the valve as heretofore, merely adds to the filling of the can from the main supply and before said can is filled.

The position of the displacement base 4 in the can determines the volume of syrup supplied, and this volume may be varied in the present construction by the vertical adjustment of the extension screw ring 19.

The inverted bell or dish-shape of the displacement base 4 is of advantage, in that it presents minimum obstruction in the can and permits the relatively solid contents to rise above the liquid level without injury. The rise of said contents into the bell of said base is provided for in the predetermined ratio of the capacity of the displacement air-body to the space outside, so that the volume of displacing air is still sufficient to prevent an excess of syrup.

I claim:—

1. In a filling-valve-structure for syrupers, the combination of an inverted dish-shaped member peripherally spaced within an associated can to be filled and adapted to confine an underlying displacement-air-body, said member having a peripheral air-exit-duct; means for supplying the syrup to the can through the space surrounding said member; means for opening and closing said space and said air-exit-duct simultaneously; and an adjustable extension member fitted to the bottom of the dish-shaped member, to vary the volume of syrup supplied.

2. A filling-valve-structure for syrupers, comprising an outlet fitting from the syrup supply tank, adapted to communicate with an associated can to be filled, said fitting having an inverted dish-shaped base peripherally spaced within the can and adapted to confine an underlying displacement-air-body, said base having a valve-seat at its outer portion and an air-exit-duct leading from said valve seat; and a slidably mounted valve sleeve carried by said outlet fitting and having a valve member coacting with the valve seat of the base, to normally close both the communication between said fitting and the can interior, and between the can interior and the air-exit-duct, and to open both under the contact pressure of the can top.

3. A filling-valve-structure for syrupers comprising an outlet fitting from the syrup supply tank, adapted to communicate with an associated can to be filled, said fitting having an inverted dish-shaped base peripherally spaced within the can and adapted to confine an underlying displacement-air-body, said base having a valve-seat at its outer portion and an air-exit-duct leading from said valve seat; a slidably mounted valve sleeve carried by said outlet fitting and having a valve member coacting with the valve seat of the base, to normally close both the communication between said fitting and the can interior, and between the can interior and the air-exit-duct, and to open both under the contact pressure of the can top, and an adjustable ring extension screwed upon the bottom of the outlet fitting base, to vary the penetration of the latter into the can.

4. A filling-valve-structure for syrupers comprising an outlet fitting from the syrup supply tank adapted to communicate with an associated can to be filled, said fitting having an inverted dish-shaped base peripherally spaced within the can and adapted to confine an underlying displacement-air-body, said base having a valve seat at its outer portion and an air-exit-duct leading from said valve seat; an air exit pipe fitted to said base and communicating with the air-exit-duct, said pipe leading up through the fitting and into the syrup supply tank above the level of the syrup therein; and a slidably mounted valve sleeve carried by said outlet fitting and having a valve member coacting with the valve seat of the base, to normally close both the communication between said fitting and the can interior, and between the can interior and the air-exit-duct, and to open both under the contact pressure of the can top.

5. A filling-valve-structure for syrupers comprising an outlet fitting adapted to be screwed into the bottom of a syrup supply tank, said fitting having an inverted dish-shaped base peripherally spaced within a can to be filled and adapted to confine an underlying displacement-air-body, said base having a valve-seat and an air-exit-duct leading from said valve seat; a slidably mounted valve sleeve carried by said outlet fitting and having a valve member coacting with the seat of the base, to normally close both the communication between said fitting and the can interior and between the can interior and the air-exit-duct, and to open both under the contact pressure of the can top; a ring adapted to bear up under the tank in fitting the valve structure thereto; slidable limiting bolts connecting the ring and the slidable valve sleeve, and springs between said ring and sleeve.

In testimony whereof I have signed my name to this specification in the presence of two subscribing witnesses.

ALBERT R. THOMPSON.

Witnesses:
  Wm. F. Booth,
  D. B. Richards.